J. S. ELLIOTT.
Molds for Casting Molds.

No. 137,901. Patented April 15, 1873.

WITNESSES.
William W. Swan
Chas. P. Gorely

INVENTOR.
J. S. Elliott

UNITED STATES PATENT OFFICE.

JOSIAH S. ELLIOTT, OF CHELSEA, MASSACHUSETTS, ASSIGNOR TO UNION STONE COMPANY.

IMPROVEMENT IN MOLDS FOR CASTING MOLDS.

Specification forming part of Letters Patent No. 137,901, dated April 15, 1873; application filed April 19, 1872.

*To all whom it may concern:*

Be it known that I, JOSIAH S. ELLIOTT, of Chelsea, in the State of Massachusetts, have invented an Improved Mold for Forming Soap-Stone Molds; and I do hereby declare the following to be a full and correct description of the same, reference being had to the accompanying drawing, in which—

Figure 2:
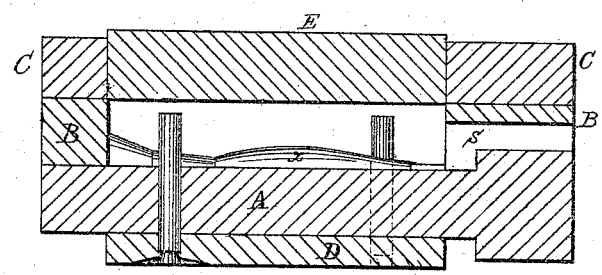
Figure 3:
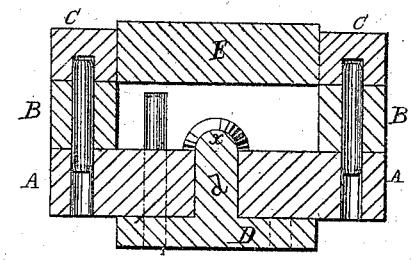
Figure 1:
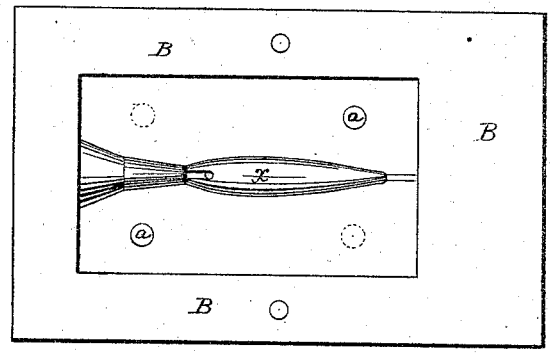

Figure 1 is a plan. Figs. 2 and 3 are sectional elevations.

A is a block, one face or the other of which, with the model, is always the bottom of the mold, which is the subject of this invention. B is a block or frame, forming the sides of the mold. As shown in the drawing, it has a slot, $s$, for a purpose to be hereafter described. C is a hopper, being of same size as A and B, with a central aperture in which fits plunger E. D is a block, to a projection, $d$, of which is glued or otherwise secured, as shown, a facsimile or model, $x$, in wood or other suitable material, of one-half of the article for making which a mold is to be made in the mold which is the subject of this invention. A longitudinal section through any part of the projecting part of D will be bounded by the same lines as a horizontal section through the middle of the article for which a mold is desired, as aforesaid. A slot through the block A is bounded by the same lines. The fac simile or model in the drawing is marked $x$. The projecting part of D to which the model is attached exactly corresponds to the thickness of the block A. It follows that the model of the article for which it is desired to make a mold will, with either face of the block A, form the bottom of the mold which is the subject of this invention. In the block A are two holes, $a\ a$, one each side of the model, as shown. In the block D also are four similar holes, so arranged that two of them will be exactly underneath the two holes in block A, whichever side of A is uppermost. Pins are used with these holes, as hereafter described. The purpose of the holes and pins is to produce proper guide-pins and holes in the soap-stone mold. There are two pins passing through the block B, as shown, by which the blocks A, B, and C are kept together, the holes in A for that purpose passing through the block, that either face may be presented to the block B. E is a plunger.

The following is the mode of operation: The several parts are put together, as shown in Figs. 2 and 3, with the exception that no use is made of the plunger E, two metallic pins passing up through holes in D, and through the holes $a\ a$ in A, as shown. The mold is then filled through the hopper with soap-stone and cement or other similar mixture, which is pressed or stamped in the usual manner, thus forming one-half of the soap-stone mold. The metallic pins are then withdrawn from the holes $a\ a$ and from the holes in D, the edges of the two holes in D first used being slightly beveled for this purpose, and the hopper E is removed. The block D is then drawn back, relieving the soap-stone or other mixture from the model, so that edges of the soap-stone mold shall not be broken or injured when the mold which is the subject of this invention is taken apart. The blocks A and B are then turned over and the block A taken off, leaving the soap-stone mold in the block B. The plunger is pushed up through B, removing the soap-stone model formed therein. To form the remaining part of the soap-stone mold the block A is reversed, and the block D applied to what now becomes the bottom of A; and the metallic pins are pushed up through the two holes of D not formerly used, passing through the holes $a\ a$.

The remaining part of the operation is the same as before, with the exception that the pins are not withdrawn from the soap-stone, but left in the same to become guide-pins, which shall fit in the holes formed in the other half of the soap-stone mold, as before described.

The model represented in the drawing is that of one-half of a mackerel-jig, with a cone to form the space in the soap-stone, through which the lead may be poured to form the jig. The slot $s$ in the drawing is to hold two metallic blades which are to be tamped into the soap-stone mixture for the purpose of holding the fish-hook, to the shank of which the lead is to be applied.

I claim—

1. A mold for forming molds of soap-stone mixture or other similar material, in which the same model is used to form both faces of the soap-stone mold, substantially as specified.

2. The blocks A and D with their holes and pins, substantially as described, for the purpose specified.

3. The fac-simile or model, x, arranged as described, in relation to the blocks D and A, so that it may be withdrawn from the soap-stone, substantially as and for the purpose described.

The above specification of my said invention signed and witnessed at Boston this 11th day of April, A. D. 1872.

J. S. ELLIOTT.

Witnesses:
WILLIAM W. SWAN,
CHAS. P. GORELY.